United States Patent [19]

Ward et al.

[11] Patent Number: 4,529,467
[45] Date of Patent: Jul. 16, 1985

[54] FIRE PROTECTIVE INTUMESCENT MASTIC COMPOSITION AND METHOD EMPLOYING SAME

[75] Inventors: Thomas A. Ward; Stanley T. Greer, both of Pittsburgh; William G. Boberski, Gibsonia; Jerome A. Seiner, Pittsburgh, all of Pa.

[73] Assignee: PPG Industries, Inc., Pittsburgh, Pa.

[21] Appl. No.: 545,286

[22] Filed: Oct. 25, 1983

[51] Int. Cl.$^3$ .............................................. C09J 5/02
[52] U.S. Cl. .............................. 156/307.3; 52/232; 106/18.13; 106/18.16; 106/18.27; 156/71; 156/278; 156/330; 252/602; 252/606; 260/516.24; 427/386; 428/247; 428/913; 428/920; 428/921; 521/85; 521/90; 521/91; 521/92; 521/907; 523/179
[58] Field of Search ............ 156/71, 307.3, 278, 156/330; 252/602, 606; 52/232; 523/179; 521/85, 92, 90, 907, 91; 427/386; 428/247, 920, 913, 921; 260/516.24; 106/18.13, 18.16, 18.27

[56] References Cited

U.S. PATENT DOCUMENTS

| | | | |
|---|---|---|---|
| 2,452,054 | 10/1948 | Jones et al. | 260/17.3 |
| 2,681,326 | 6/1954 | Christianson | 260/39 |
| 2,755,260 | 7/1956 | Stilbert, Jr. et al. | 260/17.4 |
| 3,718,615 | 2/1973 | Woods et al. | 260/28 |
| 3,755,223 | 8/1973 | Engel | 523/179 |
| 3,843,526 | 10/1974 | Roth et al. | 252/8.1 |
| 3,875,106 | 4/1975 | Lazzaro | 523/179 |
| 3,913,290 | 10/1975 | Billing et al. | 52/347 |
| 3,915,777 | 10/1975 | Kaplan | 156/202 |
| 4,069,075 | 1/1978 | Billing et al. | 156/71 |
| 4,160,073 | 7/1979 | Lloyd-Lucas et al. | 521/91 |
| 4,166,743 | 9/1979 | Wortmann et al. | 252/606 |
| 4,191,675 | 3/1980 | Inagaki et al. | 260/29.3 |
| 4,212,909 | 7/1980 | Brown | 427/393.5 |
| 4,230,660 | 10/1980 | Taylor et al. | 264/311 |

FOREIGN PATENT DOCUMENTS

| | | | |
|---|---|---|---|
| 57-59876 | 12/1982 | Japan . | |
| 1445832 | 8/1976 | United Kingdom | 523/179 |

*Primary Examiner*—John J. Gallagher
*Attorney, Agent, or Firm*—Linda Pingitore

[57] ABSTRACT

An intumescent curable composition has as its principal constituents an epoxy resin; a curing agent; and an additive component which is composed of a mixture of materials which provide a source of phosphorus, zinc, boron and an expansion gas. The aforesaid composition is capable of forming a carbonaceous char upon exposure to heat or flame.

44 Claims, No Drawings

FIRE PROTECTIVE INTUMESCENT MASTIC COMPOSITION AND METHOD EMPLOYING SAME

BACKGROUND OF THE INVENTION

The present invention relates to fire protective intumescent curable compositions.

The necessity of protecting steel and concrete structural building materials such as columns, beams, girders and other steel assemblies from the damaging effects of the flames and high temperatures resulting from a fire has been recognized for several years. As a result, a variety of fire protective coating compositions have been developed and tailored for a multitude of applications. The protection of structural steel members and assemblies which remain exposed to climatic elements has been one application area of particular interest. At one time, protection of these structures was accomplished by utilizing cementitous compositions. This posed numerous difficulties; among them, the excessive weight of the cement and the fact that the cement tended to absorb and hold water which inevitably led to corrosion of the underlying steel. More recently, intumescent fire protective coating compositions have grown in popularity. An intumescent coating composition is one which will expand to form an insulating, cellular carbonaceous char structure upon exposure to sufficient heat. For example, U.S. Pat. No. 3,755,223 is directed to an epoxy resin based intumescent composition. Many of the currently available compositions, however, are not without attendant difficulties. For example, often the carbonaceous char will crack and fall off of the substrate rendering it unprotected. To minimize this difficulty, external reinforcement is often required in conjunction with the coating composition thus increasing the cost. Moreover, the composition may not expand uniformly during a fire or, alternatively, it may expand too little or too much thereby diminishing the quality of protection for the underlying substrate. In addition, the intumescent composition may have a tendency for water absorption thus contributing to corrosion of the underlying steel. There is a need, therefore, for an intumescent fire protective composition which upon exposure to flames or excessive heat will produce an integral char which adheres to the steel substrate without the need for external reinforcement while also protecting the substrate from corrosion and other damage brought about by climatic exposure in the event that no fire occurs.

SUMMARY OF THE INVENTION

In accordance with the present invention there is provided an intumescent curable composition comprising:
(a) an epoxy resin;
(b) a curing agent adapted to cure said epoxy resin; and
(c) an additive component, comprising a mixture of materials adapted to provide a source of
  (a) phosphorus;
  (b) zinc;
  (c) boron; and
  (d) an expansion gas upon thermal decomposition;
said composition being capable of forming a carbonaceous char upon exposure to heat or flame.

Also provided in accordance with the present invention is a process for protecting a substrate from fire and excessive heat comprising:
I. applying to the surface of a substrate a coating of a char-forming intumescent curable composition comprising:
  (a) an epoxy resin;
  (b) a curing agent adapted to cure said epoxy resin; and
  (c) an additive component, comprising a mixture of materials adapted to provide a source of
    (a) phosphorus;
    (b) zinc;
    (c) boron; and
    (d) an expansion gas upon thermal decomposition;
II. overlaying the intumescent composition with a mesh member. Also provided in accordance with the present invention is a method of reducing the rate of temperature rise in a substrate when it is subjected to fire conditions, which comprises applying to the surface of the substrate a curable composition, which when exposed to fire conditions intumesces, characterized in that said composition comprises:
  (a) an epoxy resin;
  (b) a curing agent adapted to cure said epoxy resin; and
  (c) an additive component, comprising a mixture of materials adapted to provide a source of
    (i) phosphorus,
    (ii) zinc,
    (iii) boron, and
    (iv) an expansion gas upon thermal decomposition;
said composition being adapted to provide a carbonaceous char when exposed to fire conditions retaining its integral structure and adhering to the substrate without external reinforcement, with the proviso that when applied onto a 10W49 steel beam at a thickness of about 0.60 inches and subjected to Underwriter's Laboratories test, UL-263, the char that is formed is capable of maintaining the steel at a temperature below 1000° F. for a period of at least about 2 hours. There is also provided a substrate according to this method.

DETAILED DESCRIPTION OF THE INVENTION

The fire protective, intumescent curable composition of the present invention comprises as its principal ingredients an epoxy resin, a curing agent adapted to cure it, and an additive component.

An epoxy resin is one which contains at least one oxirane group, i.e.,

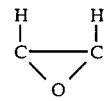

in the molecule. Hydroxyl substituent groups can also be present and frequently are, as well as halogen and ether groups. Generally, the epoxide equivalent weight ranges from about 140 to about 1780, preferably 170 to 250, more preferably from 185 to 195 and the resins can be broadly categorized as being aliphatic, aromatic, cyclic, acyclic, alicylic or heterocyclic. Preferably aromatic epoxide resins are used herein.

One particularly preferred group of aromatic epoxy resins are the polyglycidyl ethers of polyhydric aromatic alcohols, such as, for example, dihydric phenols. The phenol must be at least dihydric and suitable examples include resorcinol, catechol, hydroquinone, bis(4-hydroxyphenyl)-1,1-isobutane; 4,4-dihydroxybenzophenone; bis(4-hydroxyphenyl)-1, 1-ethane; bis(2-hydroxynaphenyl)methane; 1,5-hydroxynaphthalene and 4,4'-isopropylidenediphenol, i.e., bisphenol A. Preferably bisphenol A is utilized. Of the many epoxy compounds possible, the one principally utilized is epichlorohydrin although epibromohydrin is also quite useful. The polyglycidyl ethers especially useful herein are obtained by reacting epichlorohydrin and bisphenol A in the presence of an alkali such as sodium or potassium hydroxide. The series of epoxy resins sold by Shell Chemical Company under the trademark EPON are especially useful herein.

Another group of useful epoxy resins are the polyglycidyl ethers derived from such polyhydric alcohols as ethylene glycol; diethylene glycol; triethylene glycol; 1,2-propylene glycol; 1,4-butylene glycol; 1,5-pentanediol; 1,2,6-hexanetriol; glycerol and trimethylolpropane.

Also useful are the epoxide resins which are polyglycidyl ethers of polycarboxylic acids. These materials are produced by the reaction of an epoxy compound such as epichlorohydrin with an aliphatic or aromatic polycarboxylic acid such as oxalic acid; succinic acid; glutaric acid; terephthalic acid; 2,6-napthalene dicarboxylic acid and dimerized linoleic acid.

Still another group of epoxide resins are derived from the epoxidation of an olefinically unsaturated alicyclic material. Among these are the epoxy alicyclic ethers and esters well known in the art.

Besides the materials discussed above, useful epoxy resins also include those containing oxyalkylene groups, i.e.,

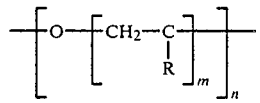

wherein R is hydrogen or $C_1$ to $C_6$ alkyl,, m is an integer from 1 to 4 and n is an integer from 2 to 50. Such groups can be pendant from the backbone of the epoxide resin or they can be included as part of the backbone. The proportion of oxyalkylene groups in the epoxy resin depends upon a number of factors, among them, the size of the oxyalkylene group and the nature of the epoxy resin.

One additional class of epoxy resins encompasses the epoxy novolac resins. These resins are prepared by reacting an epihalohydrin with the condensation product of an aldehyde with a monohydric or polyhydric phenol. One example is the reaction product of epichlorohydrin with a phenolformaldehyde condensate. A mixture of epoxy resins can also be used herein.

The aforedescribed epoxy resins require the addition of a curing agent in order to convert them to thermoset materials. In the curing process, both the epoxy groups and the hydroxy groups (if present) can participate and curing can take place either at ambient temperature or upon application of heat. In general, the curing agents which can be utilized herein can be selected from a variety of conventionally known materials, for example, amine type, including aliphatic and aromatic amines, and poly(amine-amides). Examples of these include diethylene triamine; 3,3-amino bis propylamine; triethylene tetraamine; tetraethylene pentamine; m-xylylenediamine; and the reaction product of an amine and an aliphatic fatty acid such as the series of materials sold by General Mills Chemicals, Inc. under the trademark VERSAMID. Preferably the poly(amine-amide) materials such as VERSAMID or its equivalent are utilized.

Also suitable as curing agents are polycarboxylic acids and polycarboxylic acid anhydrides. Examples of polycarboxylic acids include di-, tri-, and higher carboxylic acids such as, for example, oxalic acid, phthalic acid, terephthalic acid, succinic acid, alkyl and alkenyl-sustituted succinic acids, tartaric acid, and polymerized fatty acids. Examples of suitable polycarboxylic acid anhydrides include, among others, pyromellitic anhydride, trimellitic anhydride, phthalic anhydride, succinic anhydride, and maleic anhydride.

In addition, aldehyde condensation products such as urea-, melamine-, or phenol-formaldehyde are very useful curing agents. A variety of these materials are commercially available under several trademark designations, for example, BEETLE and CYMEL from American Cyanamid and RESIMENE from Monsanto Industrial Chemicals Co.

Other suitable curing agents include boron trihalide and complexes of boron trihalide with amines, ethers, phenols and the like; polymercaptans; polyphenols; metal salts such as aluminum chloride, zinc chloride and magnesium perchlorate; inorganic acids and partial esters such as phosphoric acid and n-butyl orthophosphite. It should be understood that blocked or latent curing agents can also be utilized if desired; for example, ketimines which are prepared from a polyamine and a ketone.

The amount of the epoxy resin and curing agent utilized in preparing the claimed fire protective intumescent mastic composition can vary, but generally the equivalent ratio of epoxy to amine is within the range of from 0.05:1 to 10:1. Preferably, the epoxy to amine equivalent ratio is within the range of from 0.1:1 to 1:1 and more preferably within the range of 0.3:1 to 0.9:1.

The additive component of the claimed mastic composition comprises a mixture of materials adapted to provide a source of phosphorus, zinc, boron, and expansion gas upon thermal decomposition. In a preferred embodiment the additive component additionally contains a reinforcing filler.

The source of phosphorus can be selected from a variety of materials such as, for example, phosphoric acid, mono- and di-ammonium phosphate, tris-(2-chloroethyl)phosphate, phosphorus-containing amides such as phosphorylamide, and melamine pyrophosphate. Preferably the source of phosphorous acid is an ammonium polyphosphate represented by the formula:

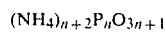

wherein n is an integer of at least 2, preferably n is an integer of at least 50. Examples of such materials are those commercially available under the trademark designations PHOS-CHEK-P-30 from Monsanto Corporation, and AMGAD IU from Albright and Wilson Corp. Preferably, PHOS-CHEK-P-30 is utilized herein. The claimed intumescent composition typically contains an amount of phosphorus which ranges from about 0.05 to about 20 percent by weight, preferably 0.5 to 10 percent by weight, the percentages being based upon the total weight of the epoxy resin, curing agent, and the additive component. The phosphorus is believed to function as a char promoter in the intumescent composition.

The expansion gas serves to cause the fire protective composition to foam and swell, i.e., intumesce, when exposed to high temperatures or flames. As a result of this expansion the char which is formed is a thick, multi-celled material which serves to insulate and protect the underlying substrate. Preferably, the source of expansion gas is a nitrogen-containing material. Examples of suitable nitrogen-containing materials include melamine, methylolated melamine, hexamethoxymethyl melamine, urea, dimethylurea, melamine pyrophosphate, dicyandiamide, guanylurea phosphate and glycine. Preferably, melamine is utilized. Other conventional sources of expansion gas can also be used such as those materials which liberate carbon dioxide. The source of expansion gas is usually present in the compositions of the present invention in an amount ranging from 0.1 to 25 percent by weight, preferably 1 to 10 percent by weight, the percentages being based upon the total weight of the epoxy resin, curing agent, and the additive component.

The source of zinc can be selected from a variety of materials. It is believed that the zinc material contributes to the formation of a small-celled structure in the char. The small cells of the char afford better insulation for the substrate and are better able to retain the char's integrity and adhere to the substrate even in the absence of external reinforcing materials. Thus, cracking of the char and its breaking away from the substrate are minimized and a greater measure of protection is afforded to the underlying steel. Examples of suitable materials which are sources of zinc include zinc oxide, zinc salts such as zinc borate and zinc phosphate; zinc carbonate; also zinc metal can be used. Preferably zinc oxide, zinc borate or zinc phosphate are utilized. Usually the claimed intumescent composition contains an amount of zinc which ranges from about 0.1 to 25 percent by weight, preferably 0.5 to 12 percent weight, the percentages being based upon the total weight of the epoxy resin, curing agent and the additive component.

The source of boron is preferably boric acid although a large variety of other materials can be utilized. It is believed that the boric acid contributes to the formation of a uniform char by acting as a fluxing aid which assists in the formation of a homogeneous melt of materials during exposure to high temperatures or flames. Examples of suitable materials which can provide boron include boron oxide, borates such as sodium borate, potassium borate and ammonium borate, also borate esters such as butyl borates or phenyl borates. After boric acid, ammonium or sodium borate are next preferred. The claimed intumescent composition usually contains an amount of boron with ranges from about 0.1 to 10 percent by weight, preferably 1 to 6 percent by weight, the percentages being based upon the total weight of the epoxy resin, curing agent and the additive component.

It should be understood that the phosphorus, zinc, boron, and expansion gas can each be provided by a separate source material or alternatively a single material may be a source of more than one of the aforelisted element. For example, melamine pyrophosphate can provide a source of both phosphorus and expansion gas.

The reinforcing filler which is a preferred constituent of the additive component can be chosen from among a large array of conventionally utilized materials including fibrous reinforcements and platelet reinforcements which are preferred over other fillers. Examples of fibrous reinforcements include glass fibers, ceramic fibers, e.g. aluminum oxide/silicon oxide, and graphite fibers. Platelet reinforcements include hammer-mill glass flakes, mica, and Wollastonite. Other suitable fillers include clay, talc, silica, and various pigments. Preferably, Wollastonite is utilized. The reinforcing filler is believed to assist in controlling expansion of the fire protective composition prior to and during char formation so that the resultant char is hard and uniform. When present, the reinforcing filler is usually present in the composition in an amount ranging from about 1 to 50 percent by weight, the percentages being based upon the total weight of the epoxy resin, curing agent and the additive component.

The fire protective intumescent composition of the present invention is preferably a two-package system with the epoxy resin in one package, the curing agent in a second package and the additive component in either the epoxy resin package or the curing agent package or in both packages. When the additive component is present in both packages the individual constituents can be in either package, as desired. The individual packages are mixed prior to use such that the epoxy to amine equivalent ratio in the resultant composition is within the broad range set forth above. The intumescent composition of the present invention can also be prepared as a single-package system. In this situation a blocked or latent curing agent would be preferred such as, for example, the ketamine curing agents which have been mentioned above. The ketamine blocked curing agents cure as a result of exposure to moisture which causes hydrolysis of the ketamine and release of the free amine curing agent. Other latent curing agents can also be utilized such as those in which the free amine curing agent is liberated as a result of exposure to radiation.

The composition of the present invention can also contain a variety of conventional additives such as stabilizers, rheology control agents, flame spread control agents, and the like. These ingredients are, of course, optional and can be added in varying amounts.

The fire protective intumescent composition of the present invention when it is prepared is usually in the form of a thick, paste-like material generally termed a mastic. The mastic can be applied by a variety of methods such as with a spray applicator or with a trowel. Preferably the claimed intumescent compositions are spray applied; therefore, thinning of the mastic composition is generally necessary prior to application. Thinning can be accomplished with a variety of conventional solvents such as methylene chloride or 1,1,1-trichloroethane. Although many conventional solvents are suitable, preferably the solvent is non-flammable and of high volatility. The claimed compositions are especially useful for application over steel substrates although they can also be used over a variety of other substrates such as reinforced concrete, plastic, and wood.

The present invention is, in one embodiment, directed to a process for protecting a substrate from fire and excessive heat, comprising:

I. applying to the surface of a substrate a coating of a char-forming intumescent curable composition as has been set forth and described above;

II. overlaying the intumescent composition with a mesh member.

Preferably the aforesaid process additionally includes the step of overlaying the mesh member with a coating of aforesaid intumescent composition so as to substantially encapsulate the entire mesh member.

The mesh member can be chosen from a large variety of reticulated materials such as wire mesh or a mesh formed from another fire resistant material such as glass. The mesh member is embedded in the mastic composition and is believed to restrain expansion of the intumescent composition during exposure to heat or flame thus minimizing the incidence of cracking in the char which is formed. In addition, should cracking occur, the mesh functions to assist in preventing the char residue from falling off of the substrate. This method is particularly advantageous for protecting steel substrates which have flange edges, channels, and angles. In this manner additional structural support is provided which assists in maintaining the integrity of the char. It should be understood that since the intumescent compositions of the present invention adhere well to most substrates, the mesh member need not be bonded directly to the substrate; preferably, it is not bonded to the substrate.

The fire protective, intumescent curable composition of the present invention provides excellent protection for structural steel members and other assemblies from the damaging effects of excessive heat and flames during a fire. The claimed compositions when burned, produce a hard, small-celled char residue which can adhere to a substrate without external reinforcement and afford excellent insulation to protect the underlying steel. Even if a fire never occurs, the compositions still afford excellent protection for the substrate, as for example, from corrosion since the compositions resist water absorption and other damage brought about by climatic exposure.

The invention will be further described in connection with the examples which follow. These examples are given as illustrative of the invention and are not to be construed as limiting it to their details.

EXAMPLE I

This Example illustrates the preparation and testing of a preferred fire protective intumescent mastic composition of the present invention.

| | Ingredients | Parts by Weight (grams) |
|---|---|---|
| Package 1: | EPON 828[1] | 35.77 |
| | Melamine | 2.75 |
| | PHOS-CHEK-P-30[2] | 4.52 |
| | Tall oil fatty acid | 4.27 |
| | Tris(2-chloroethyl) phosphate | 8.79 |
| | ATTAGEL-50[3] | 3.31 |
| | Boric acid | 20.64 |
| | Zinc borate | 7.87 |
| | Wollastonite[4] | 12.05 |
| Package 2: | VERSAMID 150[5] | 72.25 |
| | AEROSIL 200[6] | 3.50 |
| | IMSIL A-10[7] | 13.72 |
| | ATTAGEL-50 | 4.50 |
| | Talc | 6.0 |

| Ingredients | Parts by Weight (grams) |
|---|---|
| Carbon black pigment | 0.03 |

[1] This aromatic epoxy resin is prepared from bisphenol A and epichlorohydrin. It has an epoxy equivalent weight of 190 to 192 and a resin solids content of 100 percent. This resin is commercially available from Shell Chemical Company.
[2] Ammonium polyphosphate having a phosphorus content of 32 percent by weight. It is commercially available from Monsanto Corp.
[3] Attapulgite clay, used herein as a rheology control agent, which is commercially available from Englehard minerals.
[4] This fibrous reinforcing filler is commercially available from Nycor Corp. as NYAD G.
[5] This amine curing agent has an average amine equivalent weight of 149. It is commercially available from General Mills Chemicals, Inc.
[6] Fumed silica, used herein as a rheology control agent, commercially available from Degussa Corporation.
[7] This filler is an amorphous silica commercially available from Illinois Minerals.

The mastic composition was prepared by mixing together 1.65 parts by weight of Package 1 with 1 part by weight of Package 2. The mastic composition was applied to a 9 inch×9 inch×½ inch steel plate having two thermocouples embedded in it such that the top, bottom, and sides were uniformly covered with a 3/10 inch thick coating. The plate was allowed to cure for two days at room temperature and then burned in a gas fired furnace according to ASTM-E119(UL-263). The variable measured was the length of time required for the steel to reach a temperature of 1000° F. (538° C.). The test was concluded when the steel reached this temperature. [The temperature of the steel was measured by each of the thermocouples. When more than one thermocouple was utilized the average of all the thermocouples was taken, with the proviso that each individual thermocouple cannot exceed a temperature of 1200° F. (649° C.)].

The following data was obtained.

Thermocouple 1: 55:51 (minutes:seconds) to reach a temperature of 1000° F. (538° C.).

Thermocouple 2: 56:06 to reach a temperature of 1000° F. (538° C.).

The average time required to reach the conclusion of the test was 55:59. The control plate was identical to the coated plate in all respects except that it was not coated with the mastic composition. The uncoated 9 inch×9 inch×½ steel plate required 13 minutes to reach a temperature of 1000° F. (538° C.). The resultant char was hard, exhibited good expansion, and had small, round cells.

EXAMPLE II

This Example illustrates the preparation, application, and furnace testing of a fire protective intumescent mastic composition similar to that of Example I, above, with the exception that zinc oxide was used in place of zinc borate.

| | Ingredients | Parts by Weight (grams) |
|---|---|---|
| Package 1: | EPON 828 | 37.5 |
| | Melamine | 2.8 |
| | PHOS-CHEK-P-30 | 4.8 |
| | Tall oil | 4.5 |
| | Tris(2-chloroethyl) phosphate | 9.2 |
| | ATTAGEL 50 | 6.0 |
| | Boric acid | 27.4 |
| | Wollastonite | 6.5 |
| Package 2: | VERSAMID 150 | 75.0 |
| | IMSIL A-10 | 14.7 |
| | AEROSIL 200 | 3.0 |

| Ingredients | Parts by Weight (grams) |
|---|---|
| Zinc oxide | 7.3 |

This mastic composition was prepared in the manner described in Example I, above. It was also applied and tested as has been described in Example I. The coated steel plate required 65:41 (minutes:seconds) to reach a temperature of 1000° F. (538° C.).

EXAMPLE III

This Example illustrates the preparation, application, and furnace testing of an intumescent mastic composition similar to that of Example II, above, with the exception that zinc phosphate was used in place of zinc oxide.

| | Ingredients | Parts by Weight (grams) |
|---|---|---|
| Package 1: | EPON 828 | 35.77 |
| | Melamine | 2.75 |
| | PHOS-CHEK-P-30 | 4.52 |
| | Tall oil | 4.27 |
| | Tris(2-chloroethyl) phosphate | 8.79 |
| | ATTAGEL 50 | 3.31 |
| | Boric acid | 20.64 |
| | Zinc borate | 7.87 |
| | Wollastonite | 12.05 |
| Package 2: | VERSAMID 150 | 75.0 |
| | AEROSIL 200 | 3.0 |
| | Zinc phosphate | 22.0 |

This mastic composition was prepared in the manner described in Example I, above. It was applied and tested as has been described in Example I, above, with the exception that a 3 inch×3 inch×½ inch steel plate was utilized having one thermocouple embedded in it.

The coated plate required 44:10 (minutes:seconds) to reach a temperature of 1000° F. (538° C.). The control plate was identical to the coated plate in all respects except that it was not coated with the mastic composition. The uncoated 3 inch×3 inch×½ inch steel plate required 15 minutes to reach a temperature of 1000° F. (538° C.).

EXAMPLE IV

This Example illustrates the preparation, application, and furnace testing of a fire protective intumescent mastic composition similar to that of Example I, above, with the exception that ammonium borate was used in place of boric acid, and RD-2 epoxy resin was also present.

| | Ingredients | Parts by Weight (grams) |
|---|---|---|
| Package 1: | EPON 828 | 420 |
| | RD-2 Epoxy[8] | 17.3 |
| | Melamine | 33.7 |
| | PHOS-CHEK-P-30 | 55.4 |
| | Tall oil | 52.25 |
| | Tris(2-chloroethyl) Phosphate | 107.6 |
| | ATTAGEL 50 | 40.7 |
| | Ammonium borate | 253 |
| | Zinc borate | 97.8 |
| | Wollastonite | 151.1 |
| Package 2: | VERSAMID 150 | 705.29 |
| | AEROSIL 200 | 28.18 |
| | IMSIL A-10 | 103.46 |
| | ATTAGEL 50 | 33.81 |

| | Ingredients | Parts by Weight (grams) |
|---|---|---|
| | Talc | 84.54 |
| | Carbon black pigment | 0.30 |

[8]1,4 butane diol diglycidyl ether commercially available from CIBA-GEIGY Corp.

This mastic composition was prepared in the manner described above, in Example I, and applied to a 3 inch×3 inch×½ inch steel plate having one thermocouple embedded in it. The coated steel plate required 36:16 (minutes:seconds) to reach a temperature of 1000° F. (538° C.). The resultant char was hard and had a small-celled structure.

EXAMPLE V

This Example illustrates the preparation, application, and furnace testing of a fire protective intumescent mastic composition similar to that of Example I, above, with the exception that sodium borate was used in place of boric acid.

| | Ingredients | Parts by Weight (grams) |
|---|---|---|
| Package 1: | EPON 828 | 35.77 |
| | Melamine | 2.75 |
| | PHOS-CHEK-P-30 | 4.52 |
| | Tall oil fatty acid | 4.27 |
| | Tris(2-chloroethyl) phosphate | 8.79 |
| | ATTAGEL-50 | 3.31 |
| | Sodium borate | 20.64 |
| | Zinc borate | 7.84 |
| | Wollastonite | 12.05 |
| Package 2: | VERSAMID 150 | 72.25 |
| | AEROSIL 200 | 3.50 |
| | IMSIL A-10 | 13.72 |
| | ATTAGEL-50 | 4.50 |
| | Talc | 6.0 |
| | Lamp black pigment | 0.03 |

This mastic composition was prepared in the same manner described, above, in Example I and applied to a 3 inch×3 inch×½ inch steel plate having one thermocouple embedded in it. The coated steel plate required 35:42 (minutes:seconds) to reach a temperature of 1000° F. (538° C.). The resultant char was hard and had a small-celled structure.

EXAMPLE VI

This Example illustrates the preparation, application and furnace testing of an intumescent mastic composition containing zinc borate, boric acid, and Wollastonite. Packages 1 and 2 were combined to give a different epoxy to amine equivalent ratio than shown in previous Examples. Also, resistance to water absorption was demonstrated.

| | Ingredients | Parts by Weight (grams) |
|---|---|---|
| Package 1: | EPON 828 | 47.1 |
| | Melamine | 2.6 |
| | PHOS-CHEK-P-30 | 4.3 |
| | Tall oil | 4.0 |
| | ATTAGEL-50 | 3.2 |
| | Lecithin | 0.24 |
| | Boric acid | 19.60 |
| | Zinc borate | 7.50 |
| | Wollastonite | 11.00 |
| Package 2: | VERSAMID 150 | 56.30 |
| | IMSIL A-10 | 3.2 |

| Ingredients | Parts by Weight (grams) |
| --- | --- |
| AEROSIL 200 | 3.2 |
| Tris(2-chloroethyl) phosphate | 15.7 |
| Talc | 9.6 |
| ATTAGEL-50 | 3.8 |
| Carbon black pigment | 0.02 |

This mastic composition was prepared by mixing together 1.88 parts by weight of Package 1 with 1 part by weight of Package 2. The mastic composition was applied in the manner described in Example I, above, to two 3 inch×3 inch×½ inch steel plates, each plate having one thermocouple embedded in it. Both plates were allowed to cure for two days at room temperature. One plate, (A), was then burned in the manner described above in Example I. The other plate, (B), was soaked for four days in a 180° F. (82° C.) water bath prior to burning.

Plate (A) required 39:28 to reach a temperature of 1000° F. (538° C.). The char exhibited good expansion, a small cell structure, and it had not cracked.

Plate (B) required 33:32 to reach a temperature of 1000° F. (538° C.). The char exhibited a small cell structure, and it had no cracks.

EXAMPLE VII

This Example illustrates the utilization of melamine pyrophosphate as source of both phosphorus and expansion gas.

|  | Ingredients | Parts by Weight (grams) |
| --- | --- | --- |
| Package 1: | EPON 828 | 35.77 |
|  | Melamine pyrophosphate | 7.27 |
|  | Tall oil fatty acid | 4.27 |
|  | Tris(2-chloroethyl) phosphate | 8.79 |
|  | ATTAGEL-50 | 3.31 |
|  | Boric acid | 7.87 |
|  | Wollastonite | 12.05 |
|  | Zinc borate | 7.87 |
| Package 2: | VERSAMID 150 | 72.25 |
|  | IMSIL A-10 | 13.72 |
|  | AEROSIL 200 | 3.50 |
|  | ATTAGEL-50 | 4.50 |
|  | Talc | 6.0 |
|  | Carbon black pigment | 0.03 |

The mastic composition was prepared in the manner described in Example I, above. It was also applied and tested as has been described in Example I except that a 3 inch×3 inch×½ inch steel plate was utilized. The coated steel plate required an average time of 36:38 (minutes:seconds) to reach the conclusion of the test.

EXAMPLE VIII

The Example illustrates the preparation of a fire protective intumescent mastic composition which utilizes chopped glass fibers in place of Wollastonite.

|  | Ingredients | Percent by Weight |
| --- | --- | --- |
| Package 1: | EPON 828 | 37.94 |
|  | Melamine | 2.92 |
|  | PHOS-CHEK-P-30 | 4.80 |
|  | Tall oil | 4.53 |
|  | Tris(2-chloroethyl) phosphate | 9.33 |
|  | Boric acid | 21.95 |
|  | Zinc borate | 8.48 |
|  | ATTAGEL-50 | 3.53 |
|  | Chopped glass fibers (1/16 inch) | 6.55 |
| Package 2: | VERSAMID 150 | 73.83 |
|  | IMSIL A-10 | 10.83 |
|  | ATTAGEL-50 | 3.54 |
|  | AEROSIL 200 | 2.95 |
|  | Talc | 8.85 |

The mastic composition was prepared, applied, and tested in the manner described in Example I, above. The coated steel plate required an average time of 49:24 (minutes:seconds) to reach the conclusion of the test. The resultant char was hard and had a small-celled structure.

EXAMPLE IX

This Example illustrates a process for protection of a substrate according to the present invention.

A four foot, 10W49 I Beam was initially coated with 3/10 inch coating of the intumescent mastic composition detailed in Example IV, above. Over this coating was placed a chopped fiber glass mat (commercially available from PPG Industries, Inc. as 3/4 ounce ABM mat.) The fiber glass mat was then overlayed with a 3/10 inch coating of the aforesaid intumescent mastic composition. The beam was cured and burned as has been described above in Example I. The control was a four foot, 10W49 I Beam which had been coated with a 6/10 inch coating of the intumescent mastic composition described above except that it did not contain fiber glass mat. The control beam took 1 hour and 55 minutes to reach a temperature of 1000° F. (538° C.). The beam with the fiber glass mat took 2 hours and 10 minutes to reach a temperature of 1000° F. (538° C.).

Although the invention has been described with specific references and specific details of embodiments thereof, it is to be understood that it is not intended to be so limited since changes and alterations therein may be made by those skilled in the art which are within the full intended scope of this invention as defined by the appended claims.

What is claimed is:

1. A process for protecting a substrate from fire and excessive heat comprising:
   I. applying to the surface of a substrate a coating of a char-forming intumescent curable composition comprising:
   (a) an epoxy resin;
   (b) a curing agent adapted to cure said epoxy resin; and
   (c) an additive component, comprising a mixture of materials adapted to provide a source of
      (a) phosphorus,
      (b) zinc,
      (c) boron, and
      (d) an expansion gas upon thermal decomposition;
   said composition being capable of forming a carbonaceous char upon exposure to heat or flame;
   II. overlaying the intumescent composition with a mesh member; and
   III. allowing the intumescent composition to cure.

2. The process of claim 1 wherein the additive component of the composition additionally contains a reinforcing filler.

3. The process of claim 2, additionally including the step of overlying the mesh member with a coating of said intumescent composition so as to substantially encapsulate the entire mesh member.

4. The process of claim 2 wherein the epoxy resin is an aromatic epoxy resin.

5. The process of claim 2 wherein the curing agent is a polyamine.

6. The process of claim 2 wherein the material adapted to provide a source of phosphorus is an ammonium polyphosphate represented by the formula $(NH_4)_{n+2}P_nO_{3n+1}$ wherein n is an integer of at least 2.

7. The process of claim 2 wherein the reinforcing filler is Wollastonite.

8. A method of reducing the rate of temperature rise in a substrate when it is subjected to fire conditions, which comprises applying to the surface of the substrate a curable composition which when exposed to fire conditions intumesces, characterized in that said composition comprises:
(a) an epoxy resin;
(b) a curing agent adapted to cure said epoxy resin; and
(c) an additive component, comprising a mixture of materials adapted to provide a source of
  (i) phosphorus,
  (ii) zinc,
  (iii) boron, and
  (iv) an expansion gas upon thermal decomposition;
said composition being adapted to provide a carbonaceous char when exposed to fire conditions retaining its integral structure and adhering to the substrate without external reinforcement, with the proviso that when applied onto a 10W29 steel beam at a thickness of about 0.60 inches and subjected to Underwriter's Laboratories test, UL-263, the char that is formed is capable of maintaining the steel at a temperature below 1000° F. for a period of at least about 2 hours.

9. The method of claim 8 wherein the substrate is a structural steel column.

10. An intumescent, curable composition, comprising
(a) an epoxy resin;
(b) a curing agent adapted to cure said epoxy resin; and
(c) an additive component, comprising a mixture of materials adapted to provide a source of
  (a) phosphorus;
  (b) zinc;
  (c) boron; and
  (d) expansion gas upon thermal decomposition;
said composition being capable of forming a carbonaceous char upon exposure to heat or flame.

11. The composition of claim 10 wherein the additive component additionally contains a reinforcing filler.

12. The composition of claim 11 wherein the epoxy resin is an aromatic epoxy resin.

13. The composition of claim 12 wherein the aromatic epoxy resin is a polyglycidyl ether of a polyhydric aromatic alcohol.

14. The composition of claim 13 wherein the epoxy resin is the diglycidyl ether of 4,4'-isopropylidenediphenol.

15. The composition of claim 11 wherein the curing agent is a polyamine.

16. The composition of claim 15 wherein the polyamine curing agent is the reaction product of an amine and an aliphatic fatty acid.

17. The composition of claim 11 wherein the material adapted to provide a source of phosphorus is an ammonium polyphosphate represented by the formula $(NH_4)_{n+2}P_nO_{3n+1}$ wherein n is an integer of at least 2.

18. The composition of claim 17 wherein n is an integer of at least 50.

19. The composition of claim 11 wherein the material adapted to provide a source of phosphorus is a phosphorus-containing amide.

20. The composition of claim 11 wherein the material adapted to provide a source of expansion gas is a nitrogen-containing material.

21. The composition of claim 20 wherein the expansion gas-providing material is melamine.

22. The composition of claim 11 wherein the material adapted to provide a source of zinc is selected from the group containing of zinc oxide, zinc borate, and zinc phosphate.

23. The composition of claim 11 wherein the material adapted to provide a source of boron is selected from the group consisting of boric acid, ammonium borate, and sodium borate.

24. The composition of claim 11 wherein the reinforcing filler is in fibrous or platelet form.

25. The composition of claim 24 wherein the reinforcing filler is Wollastonite.

26. The composition of claim 11 as a two package system with the epoxy resin in one package, the curing agent in a second package and the additive component in either the epoxy resin package or the curing agent package, or in both packages.

27. The composition of claim 11 as a one package system wherein the curing agent is a latent curing agent.

28. A substrate which demonstrates a reduced rate of temperature rise when it is subjected to fire conditions, characterized by having applied on the substrate surface a curable composition which when exposed to fire conditions intumesces, said composition, comprising:
(a) an epoxy resin;
(b) a curing agent adapted to cure said epoxy resin; and
(c) an additive component, comprising a mixture of materials adapted to provide a source of
  (i) phosphorus,
  (ii) zinc,
  (iii) boron, and
  (iv) an expansion gas upon thermal decomposition;
said composition being adapted to provide a carbonaceous char when exposed to fire conditions retaining its integral structure and adhering to the substrate without external reinforcement, with the proviso that when applied onto a 10W49 steel beam at a thickness of about 0.60 inches and subjected to Underwriter's Laboratories test, UL-263, the char that is formed is capable of maintaining the steel at a temperature below 1000° F. for a period of at least about 2 hours.

29. The substrate of claim 28 which is a structural steel column.

30. The substrate of claim 29 wherein the additive component of the composition additionally contains a reinforcing filler.

31. The substrate of claim 29 wherein the composition additionally contains a reinforcing filler.

32. The substrate of claim 29 wherein the epoxy resin is an aromatic epoxy resin.

33. The substrate of claim 32 wherein the aromatic epoxy resin is a polyglycidyl ether of a polyhydric aromatic alcohol.

34. The substrate of claim 29 wherein the curing agent is a polyamine.

35. The substrate of claim 34 wherein the polyamine curing agent is the reaction product of an amine and an aliphatic fatty acid.

36. The substrate of claim 29 wherein the material adapted to provide a source of phosphorus is an ammonium polyphosphate represented by the formula $(NH_4)_{n+2}P_nO_{3n+1}$ wherein n is an integer of at least 2.

37. The substrate of claim 36 wherein n is an integer of at least 50.

38. The substrate of claim 29 wherein the material adapted to provide a source of phosphorus is a phosphorus-containing amide.

39. The substrate of claim 29 wherein the material adapted to provide a source of expansion gas is a nitrogen-containing material.

40. The substrate of claim 39 wherein the expansion gas-providing material is melamine.

41. The substrate of claim 29 wherein the material adapted to provide a source of zinc is selected from the group consisting of zinc oxide, zinc borate, and zinc phosphate.

42. The substrate of claim 29 wherein the material adapted to provide a source of boron is selected from the group consisting of boric acid, ammonium borate, and sodium borate.

43. The substrate of claim 29 wherein the reinforcing filler is in fibrous or platelet form.

44. The substrate of claim 43 wherein the reinforcing filler is Wollastonite.

* * * * *

UNITED STATES PATENT AND TRADEMARK OFFICE
CERTIFICATE OF CORRECTION

PATENT NO. : 4,529,467
DATED : July 16, 1985
INVENTOR(S) : Thomas A. Ward, Stanley T. Greer,
William G. Boberski, and Jerome A. Seiner It is certified that error appears in the above-identified patent and that said Letters Patent are hereby corrected as shown below:

Column 13, line 2, "overlying" should read --overlaying--;

Column 13, line 34 "10W29" should read --10W49--.

Signed and Sealed this

Twenty-second Day of October 1985

[SEAL]

Attest:

DONALD J. QUIGG

Attesting Officer

Commissioner of Patents and
Trademarks—Designate